(12) United States Patent
Yang et al.

(10) Patent No.: US 10,365,501 B2
(45) Date of Patent: Jul. 30, 2019

(54) HINGE ASSEMBLY AND GLASSES FRAME

(71) Applicant: WENZHOU SUNRISE INDUSTRIAL AND TRADING CO., LTD., Wenzhou, Zhejiang (CN)

(72) Inventors: Yufeng Yang, Zhejiang (CN); Xindong Jiang, Zhejiang (CN)

(73) Assignee: WENZHOU SUNRISE INDSUTRIAL AND TRADING CO., LTD., Wenzhou (CN)

( * ) Notice: Subject to any disclaimer, the term of this patent is extended or adjusted under 35 U.S.C. 154(b) by 12 days.

(21) Appl. No.: 15/871,948

(22) Filed: Jan. 15, 2018

(65) Prior Publication Data

US 2018/0210227 A1    Jul. 26, 2018

Related U.S. Application Data

(63) Continuation-in-part of application No. PCT/CN2017/113155, filed on Nov. 27, 2017.

(30) Foreign Application Priority Data

Sep. 5, 2017  (CN) .......................... 2017 1 0791208

(51) Int. Cl.
G02C 5/22       (2006.01)
(52) U.S. Cl.
CPC ........... G02C 5/2245 (2013.01); G02C 5/229 (2013.01); G02C 5/2236 (2013.01); G02C 5/2263 (2013.01)

(58) Field of Classification Search
CPC ...... G02C 5/22; G02C 5/2218; G02C 5/2227; G02C 5/2236; G02C 5/2272
USPC ................................ 351/153; 16/228; 206/6
See application file for complete search history.

(56) References Cited

U.S. PATENT DOCUMENTS

2009/0303431 A1 * 12/2009 Ifergan ..................... G02C 5/10
                                                    351/153

* cited by examiner

*Primary Examiner* — Hung X Dang

(57) ABSTRACT

A hinge assembly comprising a guide body, a first connection element, a second connection element, a first spring and a second spring; the guide body comprising a first end surface and a second end surface provided at opposite sides respectively, wherein the first end surface is provided with a first guide slot, the second end surface is provided with a second guide slot, and the first guide slot and the second guide slot intersect orthogonally, the first connection element is provided with first connection end extending beyond an end surface of the endpiece, the second connection element is provided with a second connection end extending beyond an end surface of the temple end, the first connection end and the second connection end are hingedly connected and pivoted with each other within the guide body; A glasses frame comprising an endpiece, a temple, and a hinge assembly.

34 Claims, 9 Drawing Sheets

HINGE ASSEMBLY AND GLASSES FRAME

CROSS REFERENCE TO RELATED APPLICATIONS

The present application is a Continuation-In-Part Application of PCT Application No. PCT/CN2017/113155 filed on Nov. 27, 2017, which claims the benefit of Chinese Patent Application No. 201710791208.3 filed on Sep. 5, 2017. All the above are hereby incorporated by reference.

TECHNICAL FIELD

The present application relates to the technical field of glasses, and more particularly relates to a hinge assembly and glasses frame.

BACKGROUND

The existing glasses frames mostly adopt structures of elastic recovery to realize the folding of the temples, and even adopt the function of multi-directional elasticity to restore automatically. These automatic recovery functions greatly improve the technology of glasses frame folding, such that a glasses frame can automatically restore to the usage state within a certain range, and it can effectively ensure that the integrity of the glasses frame is maintained within a certain range of abnormal load and accidental bending, and the service life is prolonged.

At present, a temple adopting multi-directional elastic recovery, generally have the following manners. A first manner adopts a joint with two plates at a hinge part, an endpiece and the temple are respectively connected with two pivot pins, the two plates are respectively abutted against an elastic part, one of the connection end is in a horizontal rotation and the other one of the connection end is in a pitching rotation. The hinge with such a structure, due to the distance between the two rotating shafts, is not very flexible in the actual rotation process, and in some angles or situations, there will be sluggish conditions such as jamming. There is also a multi-directional elastic hinge using the manner where a ball matches with a socket, and the ball and the socket are elastically connected with the endpiece and the temple respectively. This kind of hinge can rotate flexibly in the unfolded state of the temple, but the stability in the positioned state is poor, such that the rotation and recovery are not smooth in ordinary use. Another manner is the use of universal tube, this structure of the hinge, it is difficult to achieve the function of elastic recovery.

SUMMARY OF THIS APPLICATION

One object of the present application is to provide a hinge assembly and glasses frame which can overcome the problem of the prior art that the temple of the glasses frame is not rotated and recovered smoothly in many directions.

The present application provides a hinge assembly, which comprises:

a guide body comprising a first end surface and a second end surface provided at opposite sides respectively, wherein the first end surface is provided with a first guide slot, the second end surface is provided with a second guide slot, and the first guide slot and the second guide slot intersect orthogonally;

a first connection element, which is connected with a first spring provided in an accommodation chamber of an endpiece of a pair of glasses, and which is slidable telescopically in the axial direction of the accommodation chamber of the endpiece, and has a first connection end extending beyond an end surface of the endpiece;

a second connection element, which is connected with a second spring provided in an accommodation chamber of a temple end of a pair of glasses, and which is slidable telescopically in the axial direction of the accommodation chamber of the temple end, and has a second connection end extending beyond an end surface of the temple end; and comprises the first spring and the second spring;

wherein, the first connection end and the second connection end are hingedly connected and pivoted with each other in the guide body, the first connection end is pivotable along the first guide slot, the second connection end is pivotable along the second guide slot;

wherein, when being assembled to a pair of glasses, the first connection element is configured to compress the first spring provided in the accommodation chamber of the endpiece, and the second connection element is configured to compress the second spring provided in the accommodation chamber of the temple end, the spring force of the first spring acts on the endpiece such that the end surface of the endpiece abuts against the first end surface of the guide body, and the spring force of the second spring acts on the temple end such that the end face of the temple end abuts against the second end surface of the guide body.

The beneficial effect of the hinge assembly and glasses frame according to the present application is described as follows: in a hinge formed by the hinge assembly, the guide body of the hinge has two end surfaces and two guide slots are provided on opposite sides of the guide body, and the two guide slots intersect orthogonally with each other. The horizontal roll can be realized by the cooperation of one end surface and one guide slot, and the pitching can be realized by the cooperation of another end surface and another guide slot, so that the need for multi-direction rotation can be met. Since the connection ends of the two connection elements are hingedly connected and pivoted with each other within the guide body, that is, the middle points of the rotations in various direction are closer to each other, so that the rotation and the return are smoother and the phenomenon of stagnation will not occur.

BRIEF DESCRIPTION OF THE DRAWINGS

In order to make the technical solutions in the embodiments of the present application clearer, the accompanying drawings to be used in the embodiments and the description of the prior art will be briefly introduced below, it is apparent that the drawings in the following description are merely some embodiments of the present application and that other drawings may be obtained by those skilled in the field without departing from the inventive nature of the application.

DETAILED DESCRIPTION OF THE EMBODIMENTS

Figure 1:
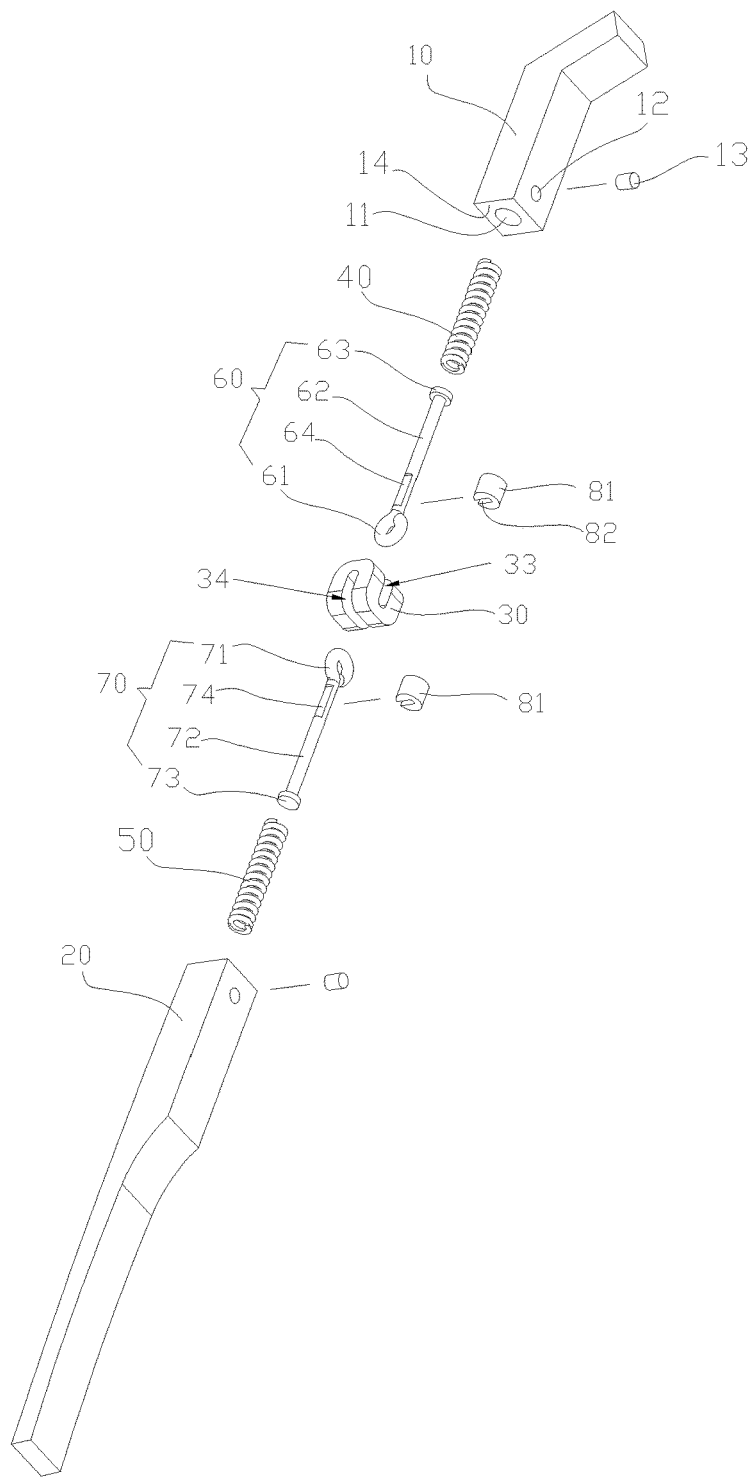
FIG. 1 is an exploded schematic view of a hinge assembly according to a first embodiment of the present application.
Figure 2:
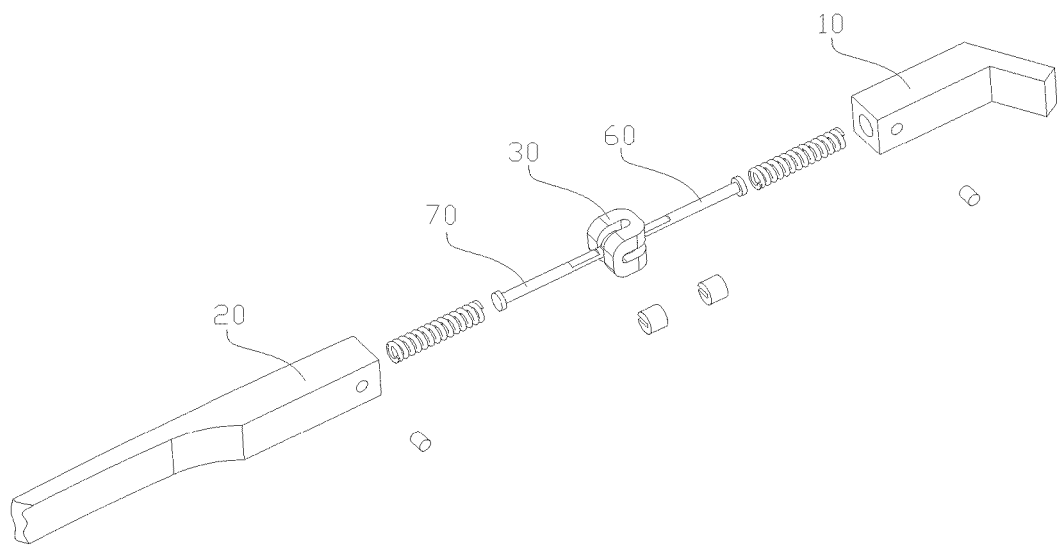
FIG. 2 is a partially exploded schematic view of the hinge assembly according to the first embodiment of the present application.

In order to make the purposes, technical solutions, and advantages of the present application clearer and more understandable, the present application will be further described in detail hereinafter with reference to the accompanying drawings and embodiments. Other objects, further aspects, and advantages of the present application will also become apparent from the following description taken in conjunction with the accompanying drawings. It should be understood that the disclosed embodiments merely illustrate various forms of the present application, and specific structural and functional details disclosed herein are not intended to limit the present disclosure, the embodiments are merely intended to explain the present application and are not intended to limit the present application. The reference numerals used in the claims and the description of the present application are merely used to help understand the present application and are not intended to limit the present application.

FIG. 1-FIG. 4 show a hinge assembly of a first embodiment of the present application, which comprises:

a guide body 30 comprising a first end surface 31 and a second end surface 32 provided on opposite sides, the first end surface is provided with a first guide slot 33, to the other opposite side, that is, the second end surface is provided with a second guide slot 34, and the first guide slot 33 and the second guide slot 34 intersect orthogonally, that is, perpendicular to each other;

a first connection element 60 elastically connected with an endpiece 10 of a glasses frame, and having a first connection end 61 extending beyond an end surface of the endpiece; a second connection element 70 elastically connected with a temple end of the glasses frame, and having a second connection end 71 extending beyond an end surface of the temple end; and the first connection end 61 and the second connection end 71 are hingedly connected and pivoted with each other within the guide body 30. As can be seen, the first connection end 61 of the first connection element 60 enters the first guide slot 33 of the guide body 30 and the second connection end 71 of the second connection element 70 enters the second guide slot 34 of the guide body, the first guide slot 33 and the second guide slot 34 intersect with each other orthogonally and a connection part enable the connection end of the two connection elements to be hingedly connected and pivoted to each other in the guide body 30, wherein the first connection end is pivotable along the first guide slot and the second connection end is pivotable along the second guide slot.

The first guide slot constrains the first connection element such that the first connection element can only swing along the first guide slot; the second guide slot constrains the second connection element such that the second connection element can only swing along the second guide slot. In the first embodiment, the first connection element 60, when being assembled to a pair of glasses and the temple is in a normal unfolded state, is accommodated in the accommodation chamber 11 provided on the endpiece except for the first connection end 61 entering the first guide slot 33, and the first end surface of the guide body is attached to the endpiece end surface; Under the action of the spring force of the first spring 40 provided in the accommodation chamber 11, the first connection end 61 extending out of the endpiece end surface 14 tightens the guide body 30 by pulling the second connection end 71 hinged orthogonally thereto, such that the first end surface 31 on the side of the guide body 30 provided with the first guide slot 33 is abutted against the endpiece end surface 14.

In the first embodiment, a specific implementation manner is described herein. The first connection element 60 further comprises the first connection end 61, a spring mandrel 62 extending through the first spring 40 and a spring stopper 63 restraining the first spring 40 from slipping off the spring mandrel; a locking element 81 fixed in the accommodation chamber 11 restricts the first spring from being pulled out of the accommodation chamber 11, as a result, when the first connection end 61 is pulled outward, the first spring is compressed and the rebound force of the first spring can make the first connection end return. Thus forming an elastical connection of the first connection element 60 and the endpiece 11, and the endpiece is also forced when the first connection end 61 extending out of the endpiece end surface 14 is pulled outward; by pre-compressing the first spring 40, the first end surface of the assembled guide body and the endpiece end surface are always abutted against each other. That is, the spring force of the first spring acts on the endpiece such that the end surface of the endpiece abuts against the first end surface of the guide body.

Similarly, the second connection element 70 is in an elastical connection with the temple end through the connection with the second spring 50 limited from being pulled out of the accommodation chamber of the temple end 20. A specific implementation manner may also be that the second connection element 70 comprises a second connection end 71, a spring mandrel 72 and a spring stop 73 disposed at the distal end of the spring. By compressing the second spring 50 whose proximal end is restrained in the accommodation chamber of the temple end 20 and under the action of the rebound force of the second spring, the guide body 30 is tightened toward the accommodation chamber in the temple end by the second connection end 71 and abutted against the end surface of the temple end. That is, the spring force of the second spring acts on the temple end such that the end face of the temple end abuts against the second end surface of the guide body.

Figure 3:
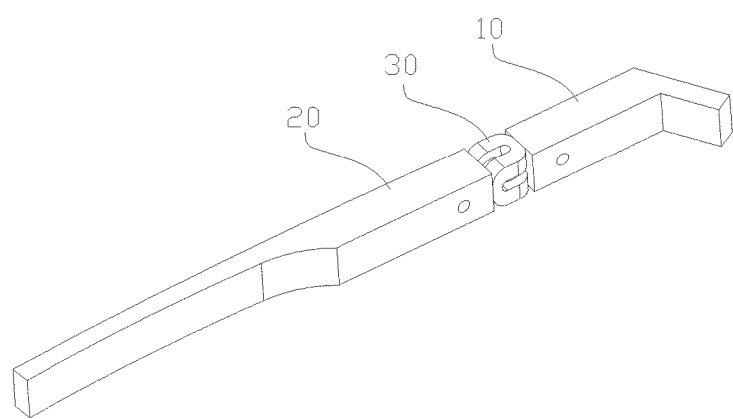
FIG. 3 is an assembled schematic perspective view of the hinge assembly according to the first embodiment of the present application after assembly.
Figure 4:
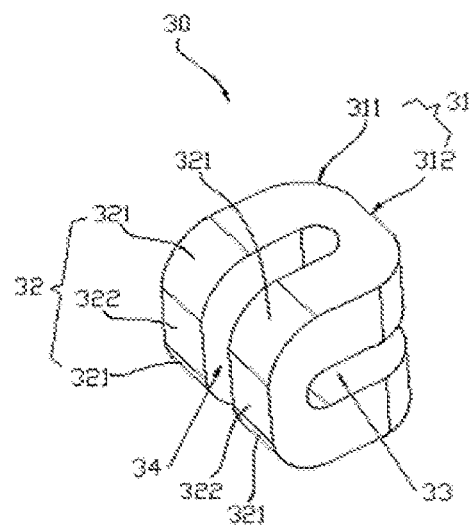
FIG. 4 is a schematic perspective view of a guide body in the hinge assembly according to the first embodiment of the present application.

In the first embodiment, the extension direction of the first guide slot 33 is horizontal, that is a direction in which the temples of a pair of glasses are normally unfolded and horizontally placed, in other words, the rotation in which temples of a pair of glasses from the normal unfolded position to the temple folded position is a horizontal rotation; with a result that the first connection element 60 may roll horizontally along the first guide slot 33 and the second connection element 70 may conduct pitching motion along the second guide slot 34. In other embodiments, the first connection element may conduct pitching motion along the first guide slot, and the second connection element may roll horizontally along the second guide slot. In the first embodiment, this corresponds to the fact that when a glasses frame is in a normally unfolded position of the temples, as shown in FIG. 3, the temple end 20 can be horizontally rolled together with the guide body 30 relative to the endpiece, including excessive flaring toward the outside of the temples, or folding the temples toward the inside of the glasses frame to the temple folded position. When the temples receive the load in the pitching direction perpendicular to the horizontal direction between the temple end and the guide body, the temple end can be pitched relative to the guide body as well as the endpiece, which can avoid damage to the temple and hinges when the temple is subjected to anomalous loads in the pitching direction.

The first connection element 60 is also provided with a flat portion 64 for limiting, and the locking element 81 is provided with a direction constraint recess 82 which matches the flat portion 64. The flat portion 64 is mounted in the direction constraint recess 82, such that the first connection element 60 can slide telescopically in the axial direction of the accommodation chamber 11 of the endpiece but is restricted from rotating in the circumferential direction of the axis of the accommodation chamber 11. That is, a direction constraint structure is provided between the endpiece and the first connection element to prevent rotation of the first connection element around the axis of the accommodation chamber of the endpiece. The locking element 81 is fixed in the accommodation chamber 11 by a column pin 13 or a screw. Similarly, a direction constraint structure is also provided between the second connection element 70 and the temple end, which allows the second connection element to slide along the axis of the accommodation chamber of the temple end, but restricts the rotation of the second connection element around the axis of the accommodation chamber of the temple end. With this setting, the temple can be restored to a normal unfolded state when the endpiece and the temple are subjected to anomalous loads in different directions at the same time and the anomalous loads in multiple directions continuously.

Further, in the first embodiment, the first end surface 31 of the guide body 30, that is end surface facing the endpiece, comprises a locating area 312 and a curved surface area 311 outside the locating area; preferably, the locating area 312 is flat. The locating area 312 is used to locate the temple in a normally unfolded state so that the temple can remain in the normally unfolded state. When a glasses frame is in the normal unfolded position, the locating area 312 is tightly abutted against the endpiece end surface; the match between the two parts is prevented from being easily wobbled, making the temple positioned in a normal unfolded position and maintain a normal unfolded state; in this first embodiment, when the glasses frame is in a normally unfolded position of the temple, the flat area is abutted against the endpiece end surface which is generally planar, benefiting the temple to remain stable in the normally unfolded position. In this state, the endpiece end surface is closest to the axis around which the endpiece rotates. When the temple is excessively open to the outside from the normally unfolded position, it is equivalent to make the first connection element 60 and the endpiece to rotate together along the first guide slot 33 to the outside, due to the deviation from the position closest to the rotation axis, the first connection end 61 is pulled outward so that the first connection end 61 extends more far beyond the endpiece end surface, further compressing the first spring, resulting in a rebound force to return. The first guide groove 33 is provided so that the rotation toward the outside can be rotated by an angle approaching 90 degrees with respect to the normally unfolded state of the temple. The curved surface area 311 outside the flat area 312 can be set as follows: the distance from a continuous points in the arc chordwise direction on the curved surface area 311 to the rotation axis increases gradually along with the increase of the rotation angle, such that the distance from the endpiece end surface to the rotation axis increases gradually until nearly rotated 90 degrees; that is, when the endpiece end surface is abutted against the curved surface area, the length of the first connection end pulled outward the endpiece gradually increases along with the increase of the rotation angle, such that the temple can automatically return to the normal unfolded state of temple when the external forces have been pulled out. Avoiding the existence of a convex ridge, it may be along with the increase of the rotation angle, when the temple turns over the convex ridge, render the length of the first connection end pulled outward the endpiece suddenly decreases, resulting in that the temple can not automatically return.

When the temple at the normal unfolded position turns to the inside, since the temple needs to be folded to the inside, normally, when the temple is rotated 45 degrees to the inside, it is considered that the temple needs to be folded at this time. Thus, the first end surface 31 may be provided with a curved surface area inside the flat area 312 narrower than the curved surface area 311 on the outside thereof, so as to connect the temple folded area 314 inside the first end surface, that is, the area where the temple is in contact with the endpiece when temple is folded, or in contact with the temple folded area 314 without providing a curved surface area. In both cases, a convex ridge will be formed inside the temple, which is located in position where the temple and the guide body have turned inwardly about 45 degrees relative to the endpiece. When rotated over the convex ridge, the distance between the endpiece end surface and the rotation axis decreases suddenly, which allows the temple to move smoothly to temple's folded position under spring force instead of returning to the temple's normal unfolded position, keeping the temple in the folded position.

The second end surface 32 of the guide body 30, i.e., the end surface facing the temple end, comprises one locating area 322 and curved surface areas 321 on the upper and lower sides of the locating area. Preferably, the locating area 322 is also a flat area 322. When a glasses frame is in the temple's normal unfolded position, the flat area 322 is abutted against the temple end surface, the temple end surface is generally planar, which benefits the temple to remain stable in the normally unfolded position. In this state, the temple end surface is closest to the axis around which the temple rotates. When the temple is turned upwards or downwards from the normally unfolded position, that is, when the temple is rotated at an elevation angle or a depression angle, it is equivalent to that the second connection element 70 and the temple are rotated together along the second guide slot 34 at the elevation angle or the depression angle. As the deviation from the position closest to the rotation axis, the second connection end 71 is pulled outward so that the second connection end 71 extends more far beyond the endpiece end surface, further compressing the second spring, resulting in a rebound force to return. The second guide groove 34 is provided so that the rotation toward the outside can be rotated by an angle approaching 90 degrees with respect to the normally unfolded state of the temple. And then, the curved surface area 321 on the upper side and the lower side of the flat area 322 may be set as follows: when the temple end surface is abutted against the curved surface area with the rotation of the temple, the length of the second connection end 71 pulled outward the endpiece gradually increases along with the increase of the rotation angle; that is, the distance between the continuous points in the arc chordwise direction on the curved surface area 321 and the rotation axis gradually increases along with the increase of the rotation angle, so that the distance between the temple end surface and the rotation axis gradually increases until approaching 90 degrees. Such that the temple can automatically return to the normal unfolded state of temple when the external forces have been pulled out.

In one embodiment, the curvature of the curved surface area of the first end surface 31 and/or the second end surface 32 of the guide body 30 is smaller than the curvature of a circular arc formed by the rotation of the endpiece or temple about the rotation axis thereof. This setup enables the temple rotated by external forces to return quickly and automatically to the normal unfolded state.

Figure 5:
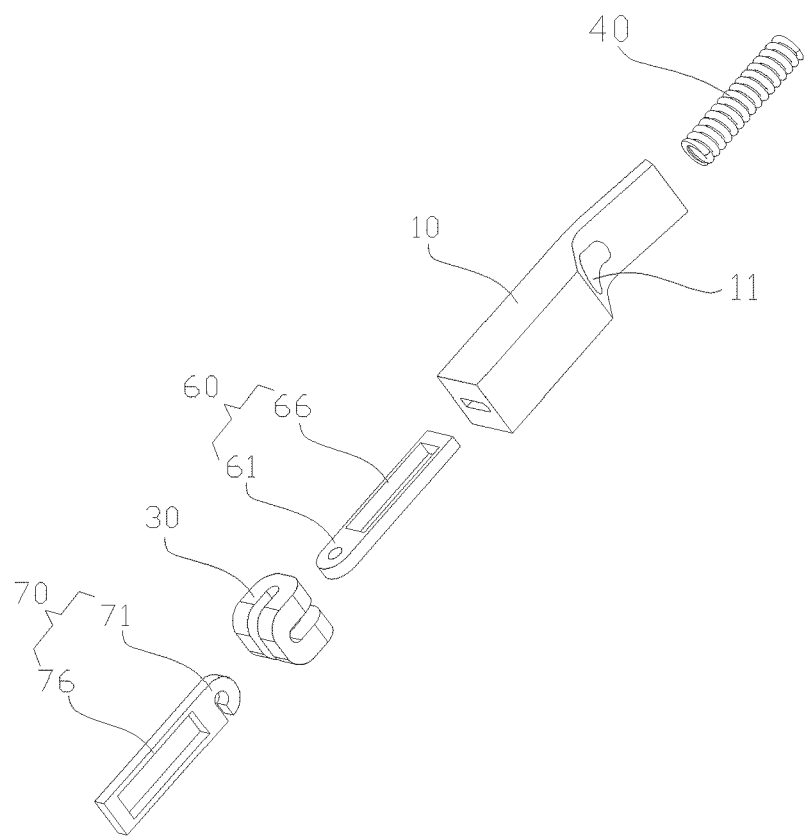
FIG. 5 is an exploded view of a part of the hinge assembly according to a second embodiment of the present application.

FIG. 5 shows a hinge assembly according to a second embodiment of the present application. It mainly differs from the hinge assembly of the first embodiment in that: the first connection element 60 comprises a first connection end 61 and a spring frame 66 connected to the first connection end, the spring frame 66 is provided and configured to load the first spring 40 therein, similarly, the first spring 40 is restricted from being pulled out of the accommodation chamber 11 of the endpiece, and the first connecting end 61 extends beyond the end surface of the endpiece. When the first connection element is pulled outward, the spring frame will compress the first spring. Similarly, when being assembled to the hinge assembly of this embodiment, the first spring will be pre-compressed by the spring frame, the first connection end tightens the second connection end, which is hinged orthogonally thereto, under the reaction force of the pre-compressed spring, thereby tightening the guide body so that the first end surface of the guide body abuts against the endpiece end surface. When the first connection element 60 is pulled outward, the spring frame 66 further compresses the spring. Similarly, the second connection element 70 provided with the spring frame 76 and temple end can also be set like this. Here, the second connection end 71 is provided with an opening that can be temporarily opened at the time of installation and returned by a tool after installation, so that the second connection end and the first connection end are respectively inserted into connection holes of the other to achieve a hinged connection.

FIG. 6a, FIG. 6b, FIG. 7a, FIG. 7b, FIG. 8 and FIG. 9 show a hinge assembly according to a third embodiment of the present application. It mainly differs from the hinge assembly of the first embodiment in that: an endpiece end surface element 15 is provided for forming the endpiece 10 together with an endpiece body 10B, the endpiece end surface element 15 comprises an end surface platform 17, an end surface 18 of the end surface platform 17 will become the end surface of the endpiece after assembly of the endpiece end surface element 15 and the endpiece body 10B, that is, an end surface abutting the first end surface 31 of the guide body 30. The endpiece end surface element 15 further comprising an interference fit portion 16 entering the accommodation chamber 11 of the endpiece so that the endpiece end surface element 15 can be fixed to the endpiece, and a hole which allows the first connection element passes through but limits the passage of the first spring. In addition, the endpiece end surface element 15 also comprises a direction constraint recess 19.

The first connection element 60 comprises a first connection end 61, a spring mandrel 62, a spring stop 63, and further comprises a flat portion 65 that is fitted with the direction constraint recess 19 of the endpiece surface element 15. The direction constraint recess 19 and the flat portion 65 form a direction constraint structure provided between the endpiece and the first connection element, which limits circumferential rotation of the first connection element around the axis of the accommodation chamber of the endpiece. That is, the first connection element is restricted from rotating about the axis of the accommodation chamber of the endpiece.

On another side of the guide body, similarly, the temple end comprises a temple end surface element 25 having the same structure. When the temple end surface element 25 is combined with the temple end housing 20B, the end surface of the end surface platform of temple end surface element 25 will become the end surface of the temple end.

Figure 6A:
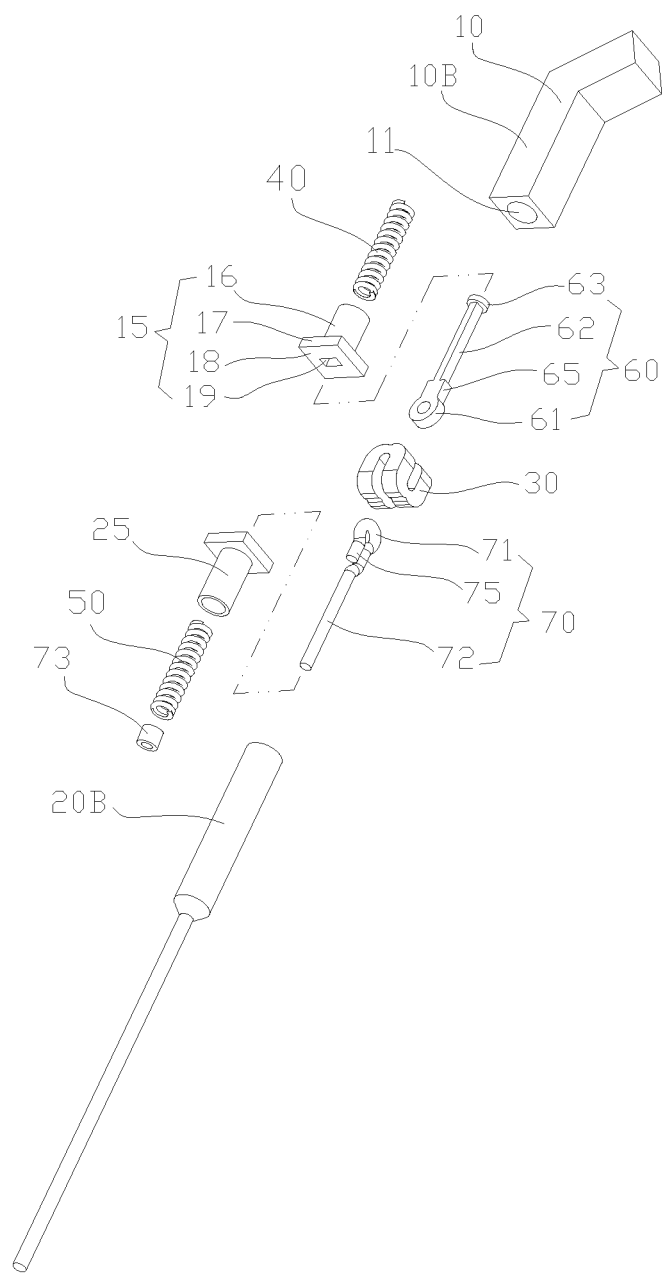
FIG. 6a is an exploded schematic view of a hinge assembly according to a third embodiment of the present application.
Figure 6B:
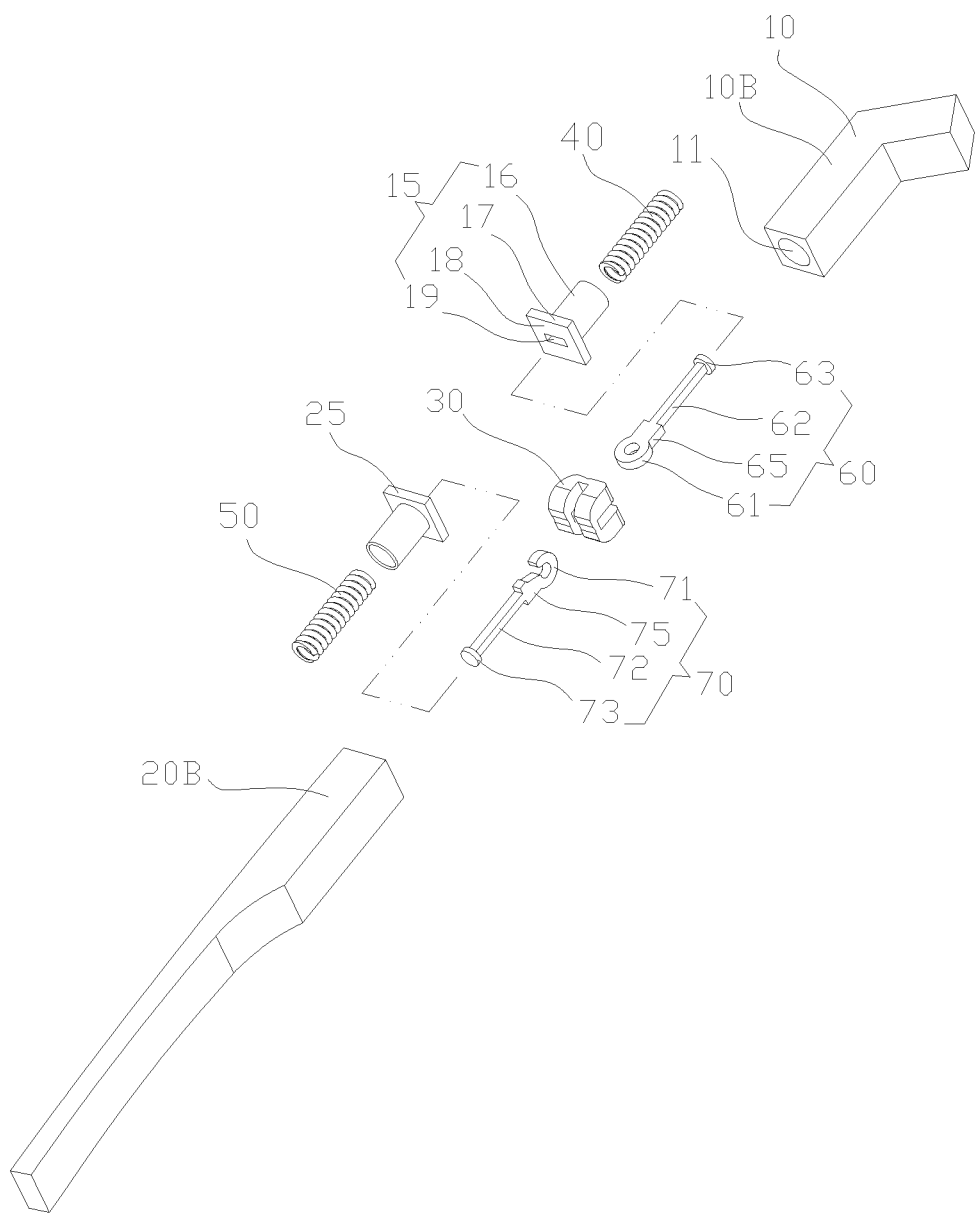
FIG. 6b is another exploded schematic view of the hinge assembly according to the third embodiment of the present application.

The second connection element 70 comprises a second connection end 71, a spring mandrel 72, and a spring stop 73, and further comprises a flat portion 75 that matches a direction constraint recess on the temple end surface element 25. Here, the second connection end 71 is a bent hook shape formed by bending a metal wire, which can temporarily open one end of the bent hook during installation and return it with a simple tool after installation so that the second connection end 71 is hingedly connected to the connection hole of the first connection end 81. Alternatively, as shown in FIG. 6b, the second connection end 71 is provided with an opening, and the second connection end 71 is inserted into the connection hole of the first connection end 61, so that the two connection ends are hinged to each other.

Figure 7A:
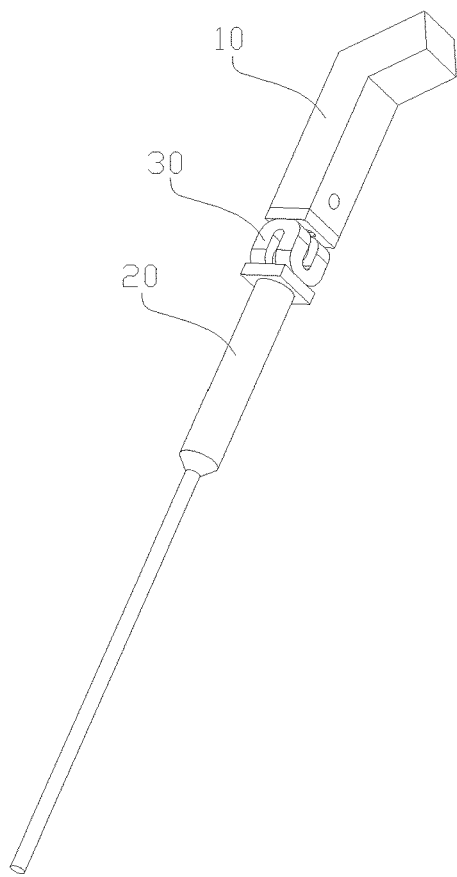
FIG. 7a is an assembled schematic perspective view of the hinge assembly according to the third embodiment of the present application.
Figure 7B:
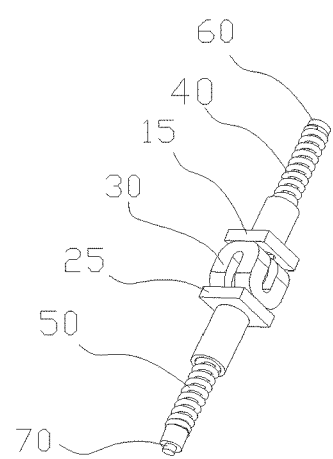
FIG. 7b is another assembled schematic perspective view of the hinge assembly according to the third embodiment of the present application.
Figure 8:
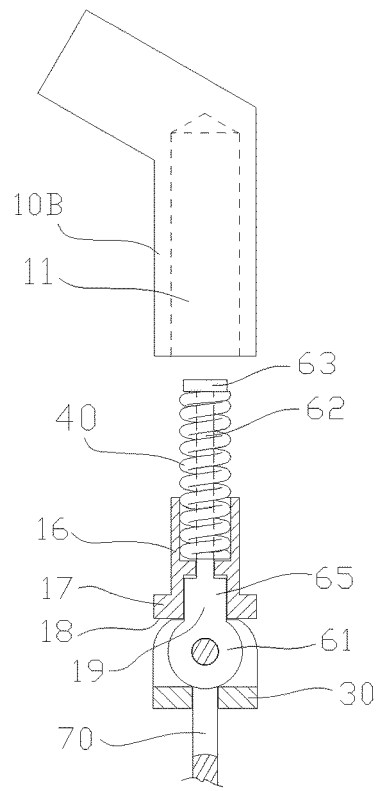
FIG. 8 is an assembled partially cross-sectional view of the guide body, a first connection element, a second connection element, and an endpiece end surface element in the hinge assembly, which are assembled, according to the third embodiment of the present application.

The above arrangement enables the first end surface of the guide body 30 and the endpiece surface to be pre-tightened before the first connection element 60 and the first spring 40 are installed in the accommodation chamber 11 of the endpiece, as shown in FIG. 8; the same applies to the second end surface of the guide body, which is beneficial for the installation of the hinge assembly of the present application. FIG. 7b shows one of the assembled state of the hinge assembly of the present embodiment, the spring has been pre-compressed, and both ends of the guide body have been abutted against the endpiece surface element and the temple end surface element, respectively.

Figure 9:
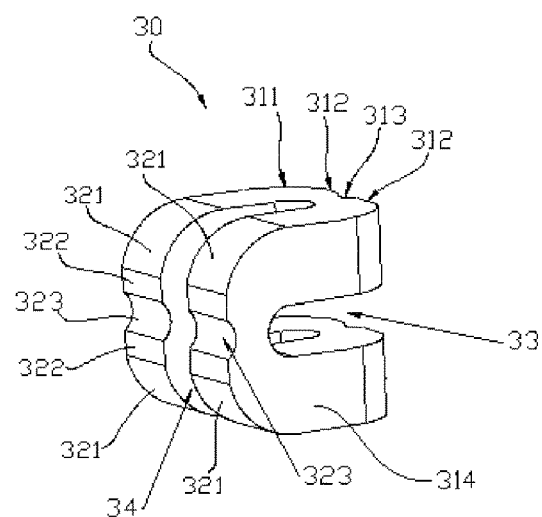
FIG. 9 is a schematic perspective view of the guide body in the hinge assembly according to the third embodiment of the present application.

The main difference between this embodiment and the hinge assembly of the first embodiment further lies in that, as the guide body 30 shown in FIG. 9, the middle portion of the locating area 312 of the first end surface 31 is provided with a concave surface 313 extending from one side to the other side of the locating area; similarly, the middle portion of the locating area 322 of the second end surface 32 is provided with a concave surface 323 extending from one side to the other side of the locating area. When a glasses frame is in the normal unfolded position of the temple, the locating area is abutted against the endpiece surface or the temple end surface, thus locating the temple and keeping the temple unfolded normally. This setting can avoid that the locating area where the two ends is high and the middle is low, ensuring the stability of the temple without shaking when the temple is in a normal unfolded state. This is also necessary even if the aforementioned locating area is the aforementioned flat area. This is especially important where the locating area is not a flat area, for example, when the locating area is an irregular arc, a concave surface extending from one side to the other is provided in an middle area thereof such that two convex surfaces formed on both sides of the concave surface, the two convex surfaces are higher than the concave surface and respectively contact the endpiece surface or the temple end surface, the locating area is abutted against the endpiece end surface or the temple end surface by the two convex surfaces on two sides of the concave surface so as to avoid that the locating area where the two ends is high and the middle is low, ensuring that the temples can be positioned and maintained in a normally unfolded state. Therefore, it can be understood that, in addition to the flat area, another embodiment of the locating area is as follows: a concave surface extending from one side to the other is provided in an middle portion of the locating area such that two convex surfaces formed on both sides of the concave surface, the two convex surfaces are higher than the concave surface and respectively contact the endpiece surface or the temple end surface, when the temple is in a normal unfolded state and the guide body is abutted against the endpiece end surface or temple end surface, the two convex surfaces higher than the concave surface are abutting against the endpiece end surface or the temple end surface, which enables temple in a normal unfolded state to maintain stable and easy to shake.

Figure 10:
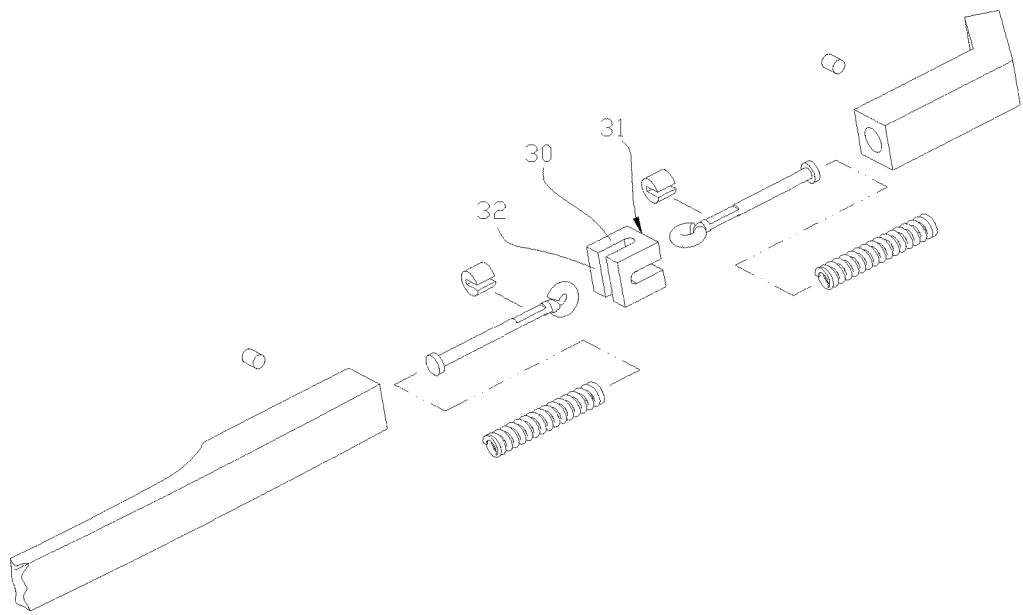
FIG. 10 is an exploded schematic view of a hinge assembly according to a fourth embodiment of the present application.

FIG. 10 shows a hinge assembly according to a fourth embodiment of the present application. It mainly differs from the hinge assembly of the first embodiment in that: the first end surface 31 of the guide body 30 is a flat surface and the second end surface 32 is also a flat surface.

Figure 11:
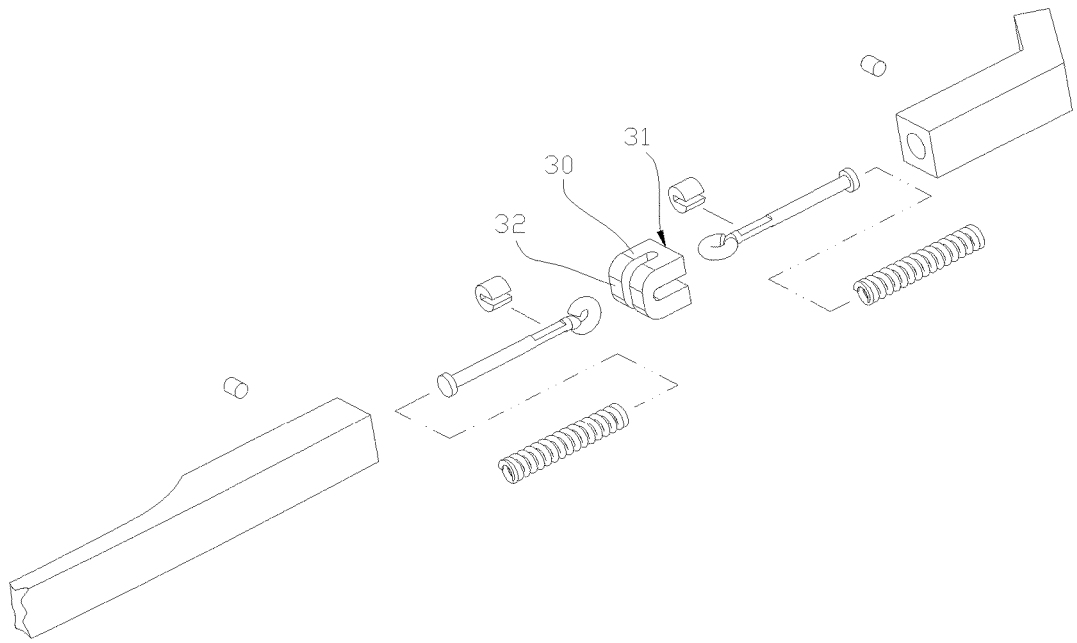
FIG. 11 is an exploded schematic view of a hinge assembly according to a fifth embodiment of the present application.
Figure 12:
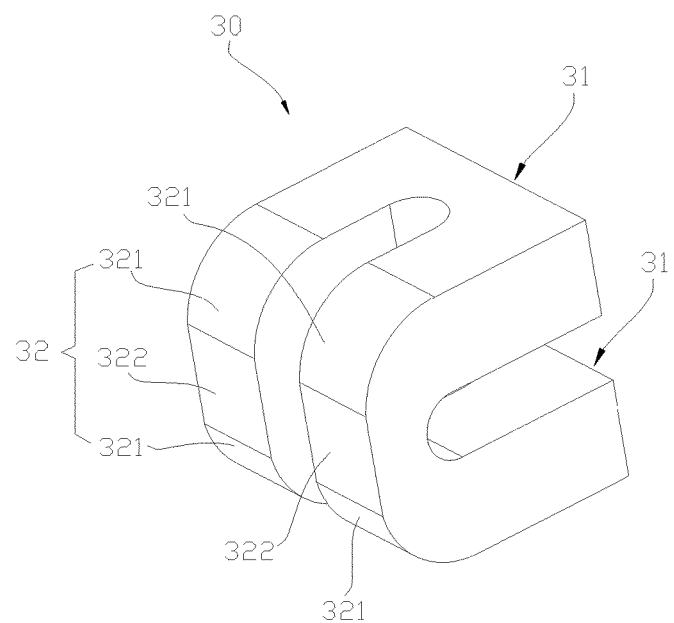
FIG. 12 is a schematic perspective view of a guide body in the hinge assembly according to the fifth embodiment of the present application.

FIG. 11 and FIG. 12 show a hinge assembly according to a fifth embodiment of the present application. It mainly differs from the hinge assembly of the first embodiment in that: the first end surface 31 of the guide body 30 is a flat surface, the second end surface 32 comprises a flat area 322, and further comprises a curved surface area 321 on both sides of the flat area.

Figure 13:
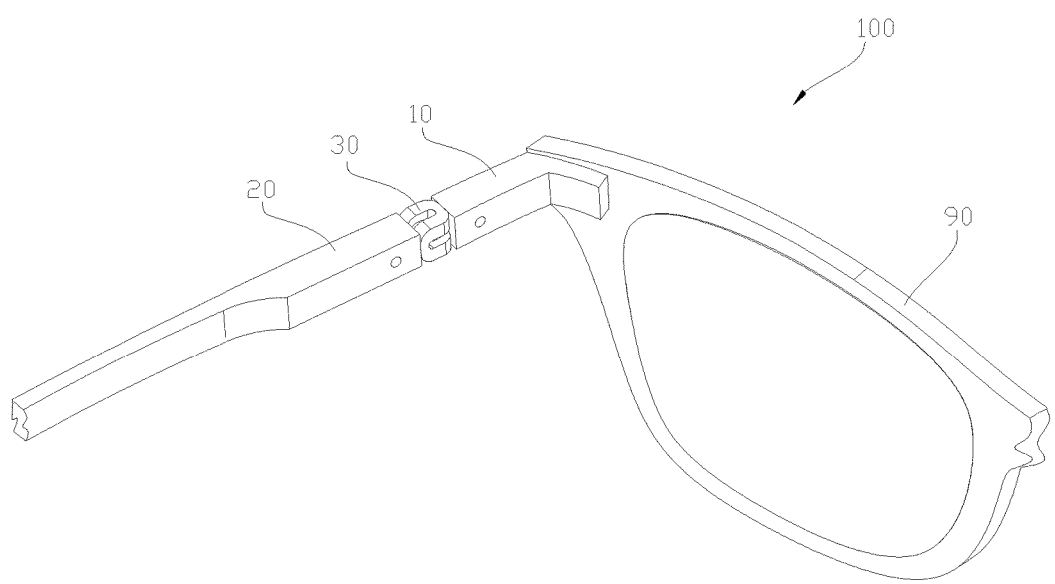
FIG. 13 is a perspective view of a glasses frame according to an embodiment of the present application.

FIG. 13 shows a glasses frame 100 of the present application, which comprises a lens frame 90, endpieces 10 and temples 20 provided on both sides of the lens frame, and a hinge assembly configured to connect the endpiece and the temple, the hinge assembly is the above-mentioned hinge assembly. The figure shows the guide body 30 between the endpiece and the temple end.

The aforementioned embodiments are only preferred embodiments of the present application, and are not intended for limiting the present application. Any modification, equivalent replacement, improvement, and so on, which are made within the spirit and the principle of the present application, should be included in the protection scope of the present application.

What is claimed is:

1. A hinge assembly, comprising:
    a guide body (30) comprising a first end surface (31) and a second end surface (32) provided at opposite sides respectively, the first end surface is provided with a first guide slot (33), the second end surface is provided with a second guide slot (34), and the first guide slot and the second guide slot intersect orthogonally;
    a first connection element (60), which is connected with a first spring (40) provided in an accommodation chamber (11) of an endpiece of a pair of glasses, and which is slidable telescopically in the axial direction of the accommodation chamber of the endpiece and has a first connection end (61) extending beyond an end surface of the endpiece;
    a second connection element (70), which is connected with a second spring (50) provided in an accommodation chamber of a temple end of a pair of glasses, and which is slidable telescopically in the axial direction of the accommodation chamber of the temple end and has a second connection end (71) extending beyond an end surface of the temple end; and
    comprising the first spring and the second spring;
    wherein the first connection end (61) and the second connection end (71) are hingedly connected and pivoted with each other in the guide body (30), the first connection end is pivotable along the first guide slot, the second connection end pivotable along the second guide slot;
    wherein, when being assembled to a pair of glasses, the first connection element is configured to compress the first spring provided in the accommodation chamber of the endpiece, and the second connection element is configured to compress the second spring provided in the accommodation chamber of the temple end, the spring force of the first spring acts on the endpiece such that the end surface of the endpiece abuts against the first end surface of the guide body, and the spring force of the second spring acts on the temple end such that the end face of the temple end abuts against the second end surface of the guide body.

2. The hinge assembly of claim 1, wherein a direction constraint structure is provided between the endpiece and the first connection element to prevent rotation of the first connection element around the axis of the accommodation chamber of the endpiece, and a direction constraint structure is provided between the temple end and the second connection element to prevent rotation of the second connection element around the axis of the accommodation chamber of the temple end.

3. The hinge assembly of claim 2, wherein the extension direction of the first guide slot is in a horizontal direction and enables the first connection element to roll horizontally along the first guide slot, and the extension direction of the second guide slot is in a pitching direction and enables the second connection element to conduct pitching motion along the second guide slot.

4. The hinge assembly of claim 2, wherein the extension direction of the first guide slot is in a pitching direction and enables the first connection element to conduct pitching motion along the first guide slot, and the extension direction of the second guide slot is in a horizontal direction and enables the second connection element to roll horizontally along the second guide slot.

5. The hinge assembly of claim 1, wherein the extension direction of the first guide slot is in a horizontal direction and enables the first connection element to roll horizontally along the first guide slot, and the extension direction of the second guide slot is in a pitching direction and enables the second connection element to conduct pitching motion along the second guide slot.

6. The hinge assembly of claim 5, wherein the first end surface (31) of the guide body comprises a locating area (312) and a curved surface area (311) outside the locating area; the second end surface (32) of the guide body comprises a locating area (322) and curved surface areas (321) on the upper and lower sides of the locating area.

7. The hinge assembly of claim 6, wherein the locating area is flat.

8. The hinge assembly of claim 6, wherein the middle portion of the locating area is provided with a concave surface (313, 323) extending from one side to the other side of the locating area.

9. The hinge assembly of claim 6, wherein the middle portion of the locating area is provided with a concave surface extending from one side to the other side of the locating area, two convex surfaces higher than the concave surface are formed on both sides of the concave surface, and in a normal unfolded state of the temple, the two convex surfaces higher than the concave surface abut against the end surface of the endpiece or the end surface of the temple.

10. The hinge assembly of claim 6, wherein the curvature of the curved surface area is smaller than the curvature of a circular arc formed by the rotation of the endpiece or the temple about the rotation axis thereof.

11. The hinge assembly of claim 7, wherein the curved surface area is configured in such a manner that the distance from continuous points in the arc chordwise direction on the curved surface area to the rotation axis about which the endpiece or the temple rotates increases gradually along with the increase of the angle by which the endpiece or the temple rotates about its rotation axis.

12. The hinge assembly of claim 5, wherein the first end surface (31) of the guide body is flat; the second end surface (32) of the guide body comprises a locating area (322) and curved surface areas (321) on the upper and lower sides of the locating area.

13. The hinge assembly of claim 12, wherein the middle portion of the locating area is provided with a concave surface extending from one side to the other side of the locating area, two convex surfaces higher than the concave surface are formed on both sides of the concave surface, and in a normal unfolded state of the temple, the two convex surfaces higher than the concave surface abut against the end surface of the temple.

14. The hinge assembly of claim 12, wherein the curved surface area is configured in such a manner that the distance from continuous points in the arc chordwise direction on the curved surface area to the rotation axis about which the temple rotates increases gradually along with the increase of the angle by which the temple rotates about its rotation axis.

15. The hinge assembly of claim 1, wherein the extension direction of the first guide slot is in a pitching direction and enables the first connection element to conduct pitching motion along the first guide slot, and the extension direction of the second guide slot is in a horizontal direction and enables the second connection element to roll horizontally along the second guide slot.

16. The hinge assembly of claim 15, wherein the first end surface of the guide body comprises a locating area and curved surface areas on the upper and lower sides of the locating area; the second end surface of the guide body comprises a locating area and a curved surface area outside the locating area.

17. The hinge assembly of claim 16, wherein the locating area is flat.

18. The hinge assembly of claim 16, wherein the middle portion of the locating area is provided with a concave surface extending from one side to the other side of the locating area.

19. The hinge assembly of claim 16, wherein the middle portion of the locating area is provided with a concave surface extending from one side to the other side of the locating area, two convex surfaces higher than the concave surface are formed on both sides of the concave surface, and in a normal unfolded state of the temple, the two convex surfaces abut against the end surface of the endpiece or the end surface of the temple.

20. The hinge assembly of claim 16, wherein the curvature of the curved surface area is smaller than the curvature of a circular arc formed by the rotation of the endpiece or the temple about the rotation axis thereof.

21. The hinge assembly of claim 16, wherein the curved surface area is configured in such a manner that the distance from continuous points in the arc chordwise direction on the curved surface area to the rotation axis about which the endpiece or the temple rotates increases gradually along with the increase of the angle by which the endpiece or the temple rotates about its rotation axis.

22. The hinge assembly of claim 15, wherein the first end surface of the guide body comprises a locating area and curved surface areas on the upper and lower sides of the locating area; the second end surface of the guide body is flat.

23. The hinge assembly of claim 22, wherein the middle portion of the locating area is provided with a concave surface extending from one side to the other side of the locating area, two convex surfaces higher than the concave surface are formed on both sides of the concave surface, and in a normal unfolded state of the temple, the two convex surfaces higher than the concave surface abut against the end surface of the temple.

24. The hinge assembly of claim 22, wherein the curved surface area is configured in such a manner that the distance from a continuous points in the arc chordwise direction on the curved surface area to the rotation axis about which the temple rotates increases gradually along with the increase of the angle by which the temple rotates about its rotation axis.

25. The hinge assembly of claim 1, wherein the first end surface (31) of the guide body is a flat surface; the second end surface (32) of the guide body is also a flat surface.

26. The hinge assembly of claim 1, wherein the first connection element further comprises a spring mandrel extending through the first spring and a spring stopper restraining the first spring from slipping off the spring mandrel, and the first spring is restricted from being pulled out of the accommodation chamber of the endpiece.

27. The hinge assembly of claim 1, wherein the second connection element further comprises a spring mandrel extending through the second spring and a spring stopper restraining the second spring slipping off the spring mandrel, and the second spring is restricted from being pulled out of the accommodation chamber of the endpiece.

28. The hinge assembly of claim 1, wherein the first connection element (60) comprises a first connection end (61) and a first spring frame (66) connected to the first connection end, the first spring frame is provided and configured to load the first spring therein, the first spring is restricted from being pulled out of the accommodation chamber of the endpiece.

29. The hinge assembly of claim 1, wherein the second connection element (70) comprises a second connection end (71) and a second spring frame (76) connected to the second connection end, the second spring frame is provided and configured to load the second spring therein, the second spring is restricted from being pulled out of the accommodation chamber of the temple end.

30. The hinge assembly of claim 1, wherein a locking element is provided and configured to prevent the first spring from being pulled out of the accommodation chamber of the endpiece, the locking element is fixed to the endpiece, the locking element is provided with a flat direction constraint recess, the direction constraint recess is provided in cooperation with a flat portion of the first connection element and restricts the circumferential rotation of the first connection element about the axis of the accommodation chamber of the endpiece.

31. The hinge assembly of claim 1, wherein a locking element is provided and configured to prevent the second spring from being pulled out of the accommodation chamber of the endpiece, the locking element is fixed to the temple end, the locking element is provided with a flat direction constraint recess, which is provided in cooperation with a flat portion of the second connection element and restricts the circumferential rotation of the second connection element about the axis of the accommodation chamber of the temple end.

32. The hinge assembly of claim 1, wherein an endpiece end surface element (15) is provided for forming the endpiece together with an endpiece body (10B), the endpiece end surface element (15) comprises an end surface platform (17), an end surface (18) of the end surface platform will become the end surface of the endpiece after assembly of the endpiece end surface element and the endpiece body, wherein the endpiece end surface element further comprises an interference fit portion (16) entering the accommodation chamber of the endpiece, and a hole which allows the first connection element passes through but limits the passage of the first spring.

33. The hinge assembly of claim 1, wherein a temple end surface element (25) is provided for forming the temple end together with an housing (20B) thereof, the temple end surface element comprises an end surface platform, an end surface of the end surface platform will become the end surface of the temple end after assembly of the temple end surface element and the temple end, wherein the temple end surface element further comprises an interference fit portion entering the accommodation chamber of the temple end, and a hole which allows the second connection element passes through but limits the passage of the second spring.

34. A glasses frame, comprising an endpiece and a temple, wherein said glasses frame further comprises the hinge assembly of claim 1, and the hinge assembly is configured to connect the endpiece and the temple.

* * * * *